United States Patent
Yamaguchi

(10) Patent No.: US 9,583,995 B2
(45) Date of Patent: Feb. 28, 2017

(54) MOTOR

(71) Applicant: Asmo Co., Ltd., Shizuoka-ken (JP)

(72) Inventor: Kazuhiro Yamaguchi, Toyokawa (JP)

(73) Assignee: ASMO CO., LTD., Shizuoka-ken (JP)

(*) Notice: Subject to any disclaimer, the term of this patent is extended or adjusted under 35 U.S.C. 154(b) by 321 days.

(21) Appl. No.: 14/337,390

(22) Filed: Jul. 22, 2014

(65) Prior Publication Data

US 2015/0028705 A1    Jan. 29, 2015

(30) Foreign Application Priority Data

Jul. 26, 2013 (JP) .................................. 2013-156096
Jul. 17, 2014 (JP) .................................. 2014-146893

(51) Int. Cl.
*H02K 11/02* (2016.01)
*H02K 5/22* (2006.01)
*H02K 13/00* (2006.01)

(52) U.S. Cl.
CPC ........... *H02K 11/026* (2013.01); *H02K 5/225* (2013.01); *H02K 13/006* (2013.01)

(58) Field of Classification Search
CPC .... H02K 11/026; H02K 13/006; H02K 5/225; H02K 5/148; H02K 11/25; F04B 17/03; F04B 35/04; F04D 5/002; H01R 39/381
See application file for complete search history.

(56) References Cited

U.S. PATENT DOCUMENTS

| | | | | |
|---|---|---|---|---|
| 5,221,130 | A * | 6/1993 | Satoh | H02K 11/026 310/239 |
| 6,104,110 | A * | 8/2000 | Uchida | H02K 11/026 310/239 |
| 6,677,693 | B2 * | 1/2004 | Ooyama | H02K 5/148 310/233 |
| 8,651,832 | B2 * | 2/2014 | Ito | F02M 37/08 417/410.1 |

(Continued)

FOREIGN PATENT DOCUMENTS

| | | | |
|---|---|---|---|
| DE | EP 1503483 A2 * | 2/2005 | ........... H02K 11/026 |
| JP | 6-311708 | 11/1994 | |

*Primary Examiner* — Tran Nguyen
(74) *Attorney, Agent, or Firm* — Patterson Thuente Pederson, P.A.

(57) ABSTRACT

A motor includes a power supplying brush, a brush holder, a choke coil, and a power supplying terminal. The brush holder holds the power supplying brush. The choke coil includes a coil portion having a coil shape, an iron core, a first connecting portion, and a second connecting portion. The iron core is inserted into the coil portion. The iron core is longer than an axial length of the coil portion. The iron core has a projecting portion projecting from the coil portion in an axial direction of the coil portion. The first connecting portion extends from an axial first end of the coil portion. The second connecting portion extends from an axial second end of the coil portion. The power supplying terminal is assembled to the brush holder. The power supplying terminal connects with at least one of the first connecting portion and the second connecting portion. At least one of the power (Continued)

supplying terminal and the brush holder includes an iron core holding portion that holds the projecting portion.

5 Claims, 6 Drawing Sheets

(56) References Cited

U.S. PATENT DOCUMENTS

| | | | | |
|---|---|---|---|---|
| 2002/0105246 A1* | 8/2002 | Ooyama | ............... | H02K 5/148 310/239 |
| 2008/0063545 A1* | 3/2008 | Takagi | ................... | F04B 17/03 417/410.1 |
| 2009/0255186 A1* | 10/2009 | Uchimura | ............. | H02K 5/148 49/358 |

\* cited by examiner

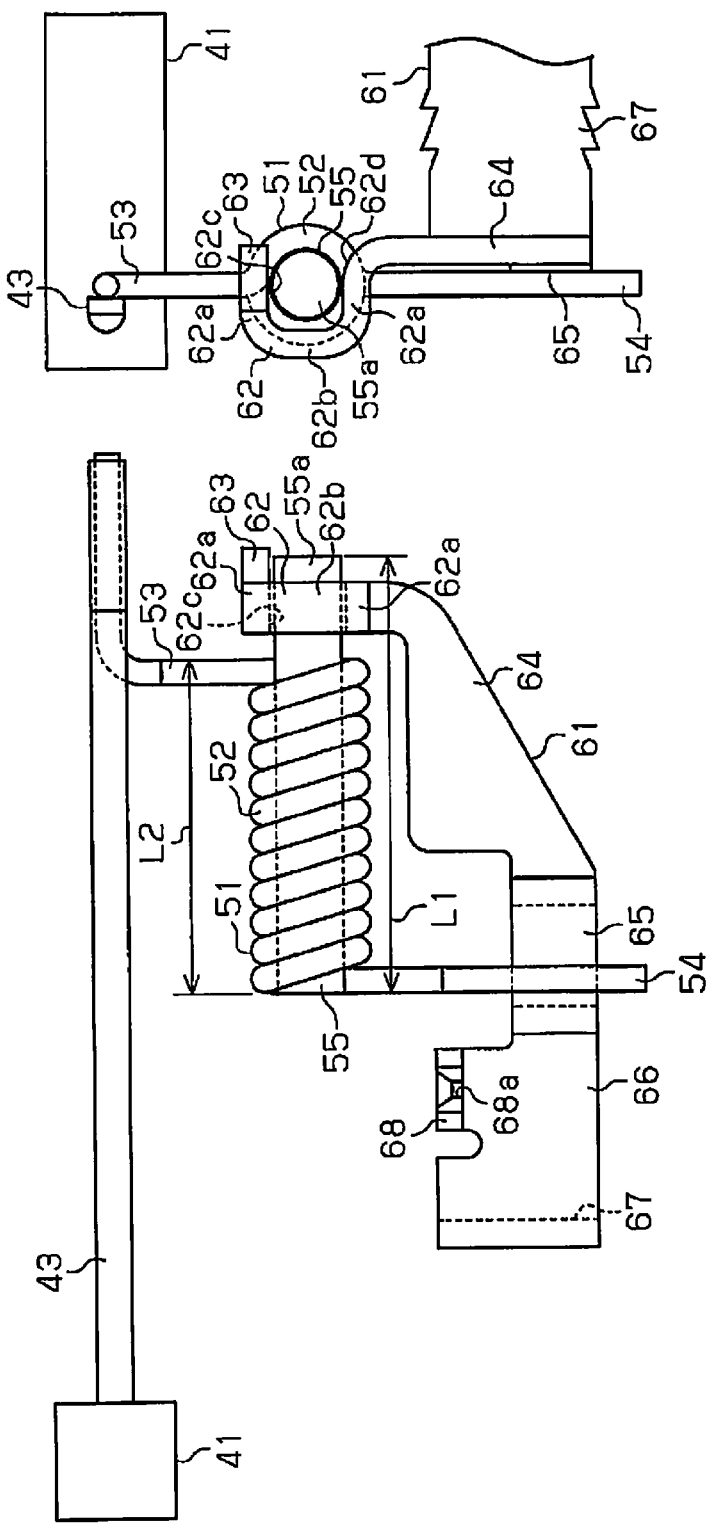

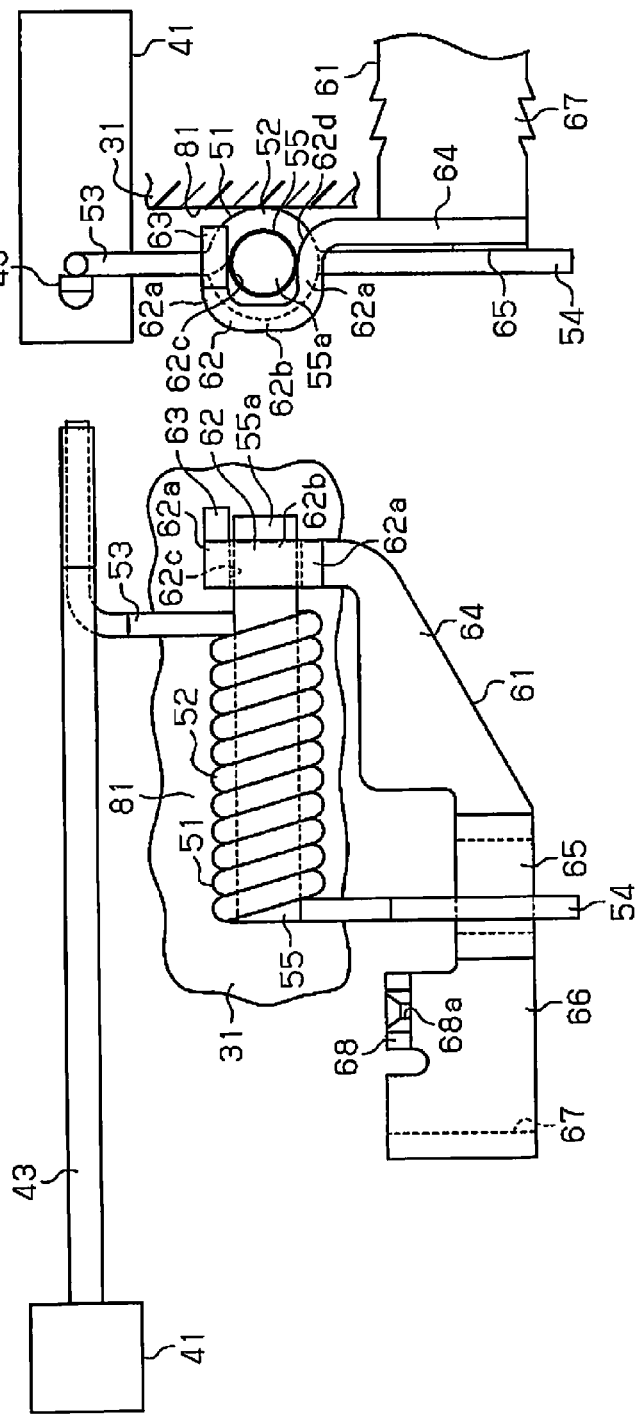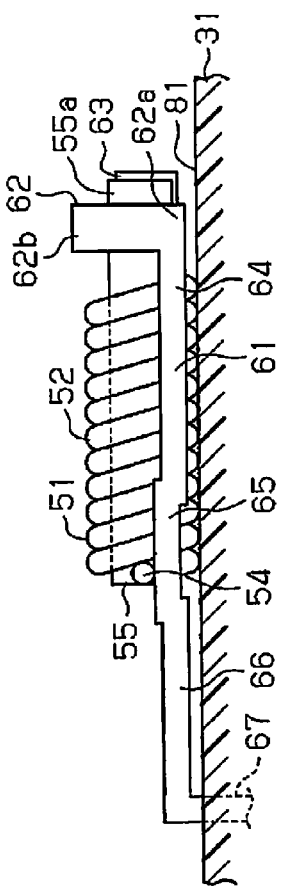

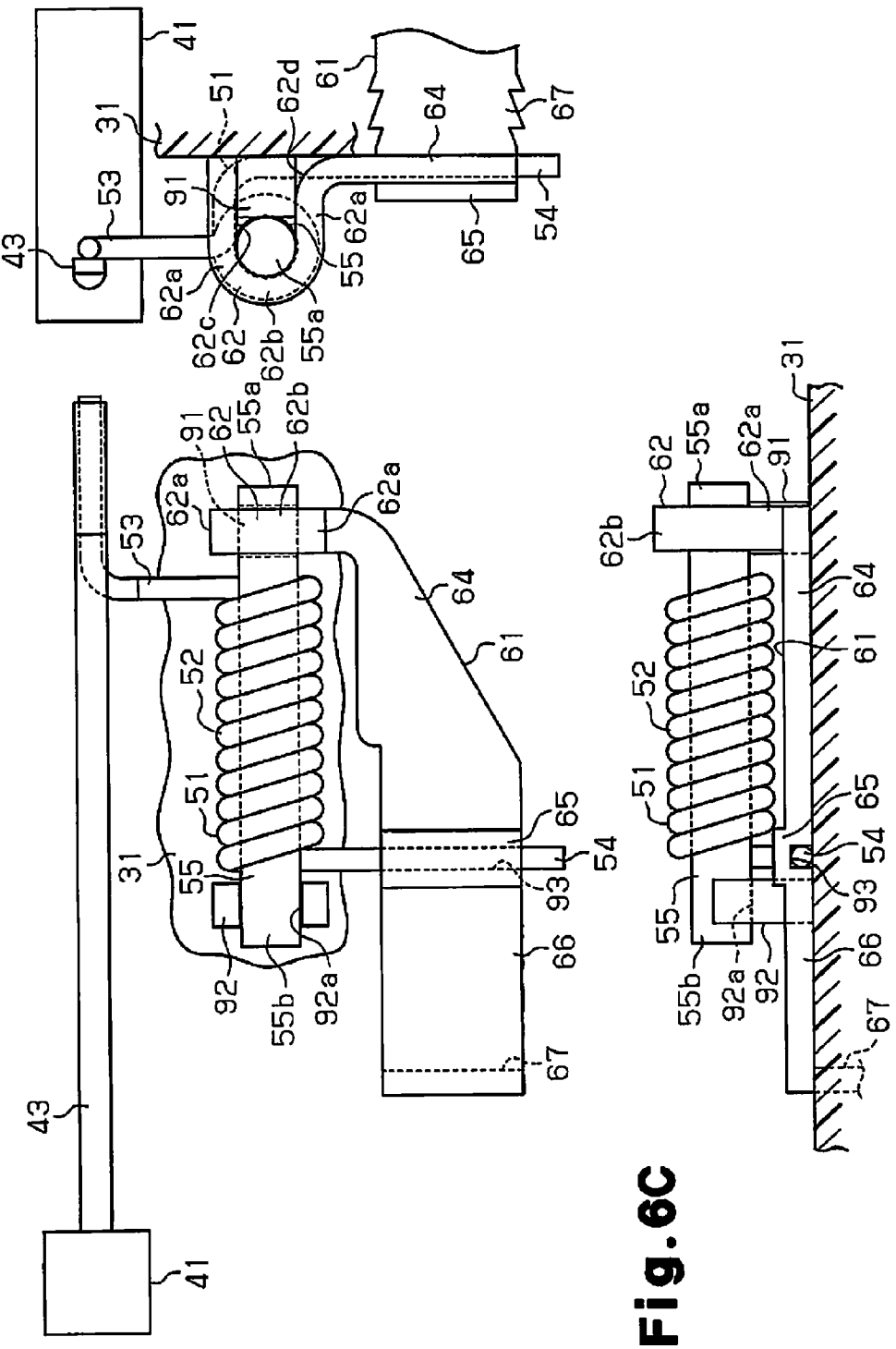

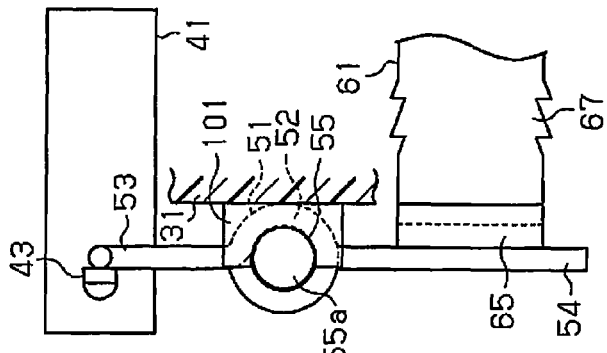
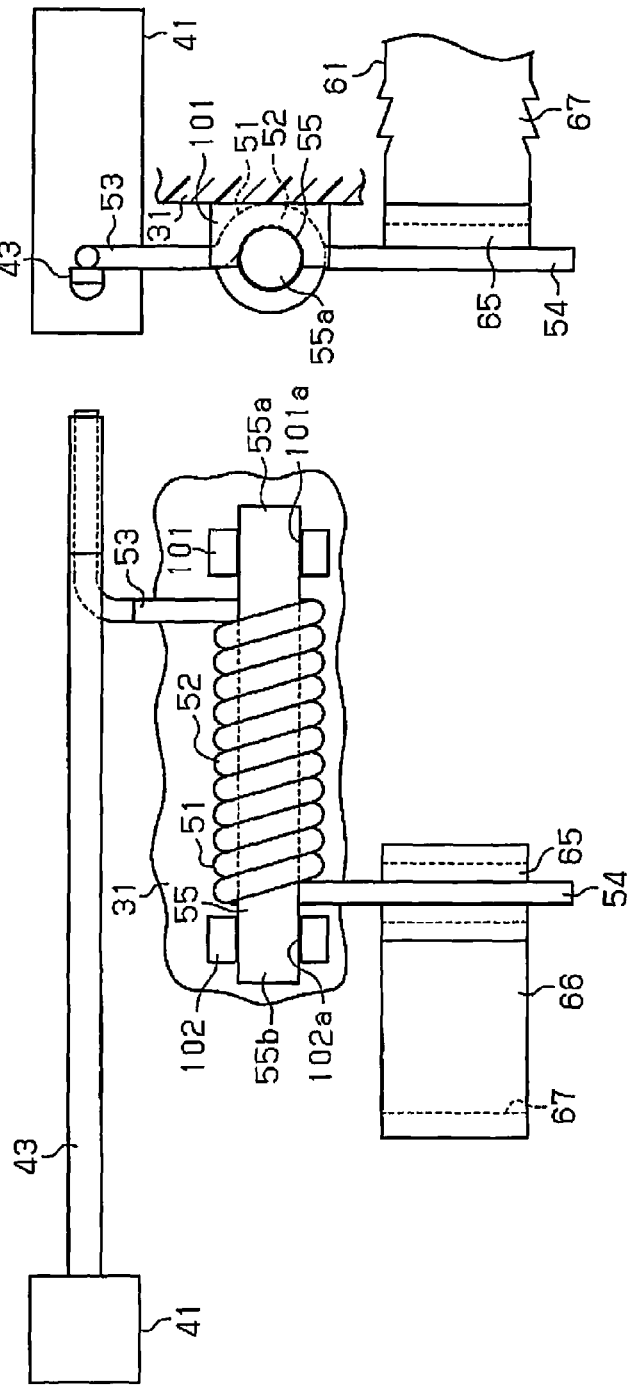
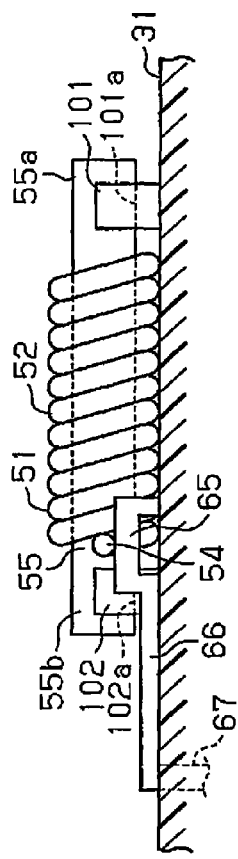

MOTOR

BACKGROUND OF THE INVENTION

The present invention relates to a motor.

Japanese Laid-Open Patent Publication No. H06-311708 describes an example of a motor that includes a choke coil for the prevention of noise.

The choke coil of the motor as described in Japanese Laid-Open Patent Publication No. H06-311708 has two connecting portions. One of the connecting portions connects with a pig tail, which is connected with a power supplying brush. The other one of the connecting portions connects with a lead wire. The power supplying brush is held by a brush holding portion arranged at a brush holder. The brush holder is arranged to close an opening portion of a cylindrical yoke housing, which has a bottom. The other one of the connecting portions, which connects with a lead wire extends toward the brush holder.

Japanese Laid-Open Patent Publication No. H06-311708 describes an example of fixing the choke coil to the brush holder though a magnetic body. In this example, the choke coil is attached to the magnetic body, which is fixed to the brush holder. One of the connecting portions of the choke coil is fixed with the brush holder by adhesion. The other one of the connecting portions of the choke coil is swaged with the pig tail by a fixing member fixed with the brush holder. The other one of the connecting portions of the choke coil is connected with the pig tail.

However, when one of the connecting portions of the choke coil is connected with the pig tail and the other one of the connecting portions of the choke coil is connected with the lead wire as described in Japanese Laid-Open Patent Publication No. H06-311708, setting the position of the choke coil is likely to be difficult since the pig tail and the lead wire are both flexible members that are likely bent. Accordingly, the choke coil may vibrate at the time of when the motor operates. This may results in the displacement of the choke coil inside the motor. When the choke coil displaces, loads apples to each of the connection between one of the connecting portion of the choke coil and the pig tail and the connection between the other one of the connecting portion of the choke coil and the lead wire. This may results in the connection failure in each connection. In this case, a component dedicated to hold the choke coil may be arranged in the interior of the motor. This would increase the number of components and increase assembling steps.

In addition, as described in Japanese Laid-Open Patent Publication No. H06-311708, when the other one of the connecting portion of the choke coil is connected with the pig tail using a fixing member, which is fixed with the brush holder, the other one of the connecting portion of the choke coil is not likely displaced in the interior of the motor since the fixing member supports the other one of the connecting portion of the choke coil. However, since this configuration requires the fixing member, which is dedicated to connect the other one of the connecting portion of the choke coil with the pig tail, the number of components is increased. In addition, since this configuration requires the step of connecting the other one of the connecting portion of the choke coil with the pig tail using the fixing member and a step of fixing the fixing member to the brush holder, the number of the steps of assembling is increased.

SUMMARY OF THE INVENTION

It is an objective of the present invention to provide a motor that suppresses the positional displacement of the choke coil, suppresses the number of the steps of assembling the choke coil from being increased and suppresses the number of the components from being increased.

To achieve the foregoing objective, a motor according to one aspect of the present invention includes a power supplying brush, a brush holder, a choke coil, and a power supplying terminal. The brush holder holds the power supplying brush. The choke coil includes a coil portion having a coil shape, an iron core, a first connecting portion, and a second connecting portion. The iron core is inserted into the coil portion. The iron core has a length longer than an axial length of the coil portion. The iron core has a projecting portion that projects from the coil portion in an axial direction of the coil portion. The first connecting portion extends from an axial first end of the coil portion. The second connecting portion extends from an axial second end of the coil portion. The power supplying terminal is assembled to the brush holder. The power supplying terminal connects with at least one of the first connecting portion and the second connecting portion. At least one of the power supplying terminal and the brush holder includes an iron core holding portion that holds the projecting portion.

To achieve the foregoing objective, a motor according to further aspect of the present invention includes a power supplying brush, a brush holder, a choke coil, and a power supplying terminal. The brush holder holds the power supplying brush. The choke coil includes a coil portion having a coil shape, an iron core, a first connecting portion, and a second connecting portion. The iron core is inserted into the coil portion. The iron core has a length longer than an axial length of the coil portion. The iron core has a projecting portion that projects from the coil portion in an axial direction of the coil portion. The first connecting portion extends from an axial first end of the coil portion. The second connecting portion extends from an axial second end of the coil portion. The power supplying terminal is assembled to the brush holder. The power supplying terminal connects with at least one of the first connecting portion and the second connecting portion. The power supplying terminal includes an iron core holding portion that holds the projecting portion.

BRIEF DESCRIPTION OF THE DRAWINGS

FIG. 2A is a plan view of apart of a brush device shown in FIG. 1B.

FIG. 2B is a right-side elevation view of FIG. 2A.

FIG. 5A is a plan view showing a part of a brush device in one modified example.

FIG. 5B is a right-side elevation view of FIG. 5A.

FIG. 5C is a front elevation view of FIG. 5A.

FIG. 6A is a plan view showing a part of a brush device in one modified example.

FIG. 6B is a right-side elevation view of FIG. 6A.

FIG. 6C is a front elevation view of FIG. 6A.

FIG. 7A is a plan view showing a part of a brush device in one modified example.

FIG. 7B is a right-side elevation view of FIG. 7A.

FIG. 7C is a front elevation view of FIG. 7A.

DETAILED DESCRIPTION OF THE INVENTION

One embodiment of a motor will be described below.

Figure 1A:
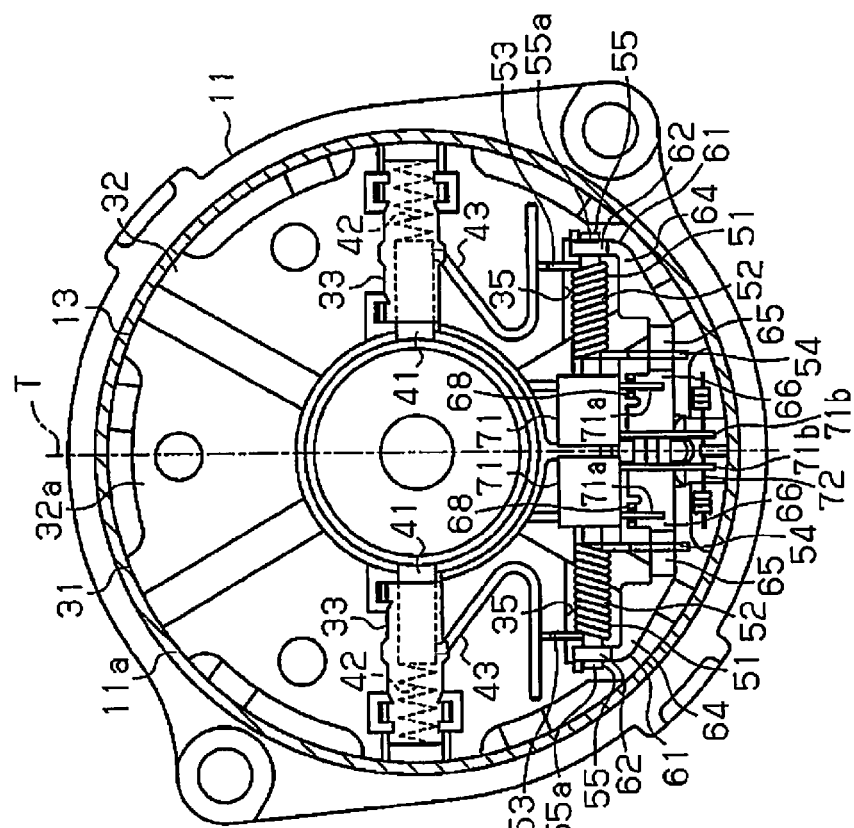
FIG. 1A is a side elevation view showing a motor according to one embodiment of the present invention.
Figure 1B:
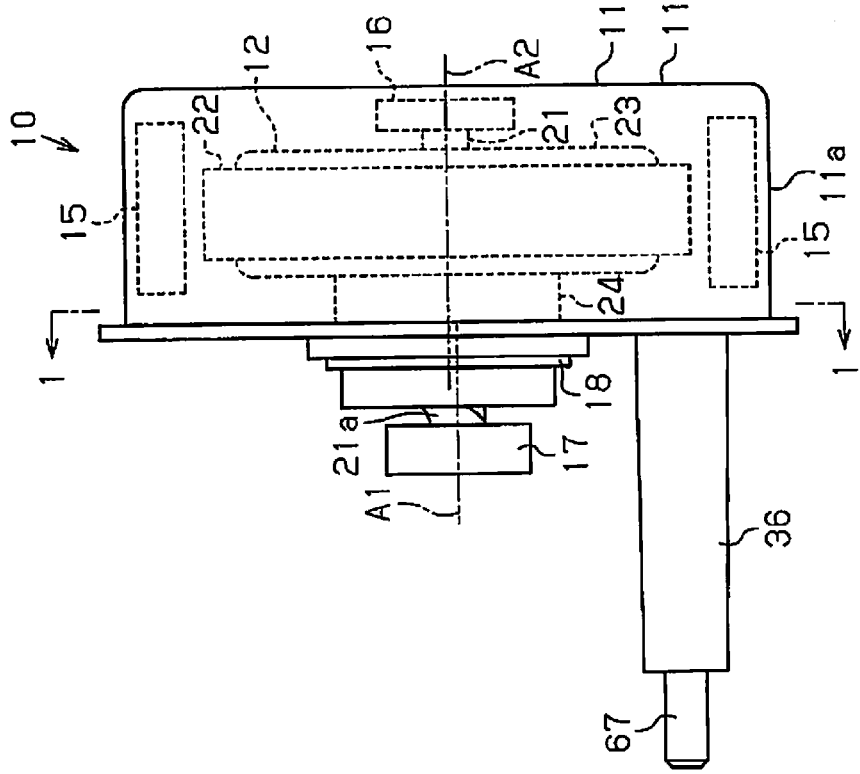
FIG. 1B is a cross-sectional view along a line 1-1 in FIG. 1A.

A motor 10 shown in FIG. 1A is used as a driving source of a pump device. As shown in FIGS. 1A and 1B, the motor 10 includes a yoke housing (hereafter, referred to as yoke 11) having an opening portion and a bottom portion 11b, an armature 12 accommodated in the yoke 11 and a brush device 13 located at the opening portion of the yoke 11.

The yoke 11 includes a circular tube portion 11a and the bottom portion 11b, which closes an axial one end of the circular tube portion 11a. The bottom portion 11b is substantially disk shaped. A plurality of magnets 15 are fixed to an inner peripheral surface of the circular tube portion 11a. Inside the yoke 11, the armature 12 is arranged inside the magnets 15. The armature 12 includes a rotation shaft 21, an armature core 22 fixed to the rotation shaft 21 and rotated integrally with the rotation shaft 21, windings 23 wound around the armature core 22, and a commutator 24 fixed to the rotation shaft 21 and rotated integrally with the rotation shaft 21.

The rotation shaft 21, which has a circular column shape, is arranged radially central portion of the yoke 11 inside the yoke 11 and extends in an axial direction of the yoke 11. A basal portion (a right end portion in FIG. 1A) of the rotation shaft 21 is rotatably supported by a bearing 16, which is arranged at a radially central portion of the bottom portion 11b. The armature 12 is rotatable around the rotation shaft 21 in a circumferential direction. A distal portion (a left end portion in FIG. 1a) of the rotation shaft 21 projects out of the yoke 11 from the opening portion of the yoke 11. An eccentric shaft portion 21a, which has a circular column shape is arranged at the distal portion of the rotation shaft 21. A central axis A1 of the eccentric shaft portion 21a extends at a portion displaced from and parallel with a rotational axis A2 of the basal portion of the rotation shaft 21 arranged inside the yoke 11. An eccentric bearing 17 is outfitted to the eccentric shaft portion 21a to support the eccentric shaft portion 21a.

The armature core 22 is outfitted to and fixed to the rotation shaft 21. An outer peripheral surface of the armature core 22 faces magnets 15 in a radial direction when arranged inside the yoke 11. The commutator 24 is outfitted to a portion of the rotation shaft 21 that is located distally with respect to the armature 12. The commutator 24 is arranged inside the yoke 11 and located close to the opening portion of the yoke 11. The windings 23 electrically connect with the commutator 24.

As shown in FIG. 1B, the brush device 13 includes a brush holder 31 formed from an insulative resin material, a pair of (two) power supplying brushes 41, which are held by the brush holder 31, and the like.

The brush holder 31 includes a base 32, which has a circular ring plate shape. The base 32 has an outer diameter substantially the same as an inner diameter of the opening portion of the yoke 11. The base 32 is fitted to the opening portion of the yoke 11 so that an axial direction of the base 32 coincides with the axial direction of the yoke 11. As shown in FIGS. 1A and 1B, a radially central part of the base 32 holds a bearing 18, which rotatably supports the distal part of the rotation shaft 21. The bearing 18 rotatably supports a portion of the rotation shaft 21 that is close to a basal end of the rotation shaft 21 with respect to the eccentric shaft portion 21a. The eccentric shaft portion 21a is arranged outside of the yoke 11 with respect to the base 32.

Two brush holding portions 33 are fixed to an inner peripheral surface 32a of the base 32 (that is, a side surface facing the interior of the yoke 11). The brush holding portion 33 constitutes the brush holder 31 together with the base 32. The brush holding portions 33 are fixed to two portions of the inner peripheral surface 32a that are located with an interval therebetween in the circumferential direction. In this embodiment, two brush holding portions 33 are fixed to two positions of the inner peripheral surface 32a of the base 32 that are located with an interval of 180° in the circumferential direction. The brush holding portions 33 extend in the radial direction on the inner peripheral surface 32a of the base 32 in the radial direction. Each of the brush holding portions 33 has a substantially C-shaped cross-section perpendicular to the radial direction that opens toward the inner peripheral surface 32a of the base 32. A power supplying brush 41, which has a square column shape and a biasing member 42, which biases a rear end portion (a radially outer end portion) of the power supplying brush 41 toward radially inner side are inserted into the interior of each brush holding portion 33. Each brush holding portion 33 restricts the power supplying brush 41 to move in the peripheral direction and guides the power supplying brush 41 to move in the radial direction. The brush holding portion 33 and the base 32 restrict the brush holding portion 33 to move in the axial direction. A distal portion (a radially inner end portion) of the power supplying brush 41 projects radially inward from a radially inner end portion of the brush holding portion 33. The distal portion of the power supplying brush 41 is pressed toward and slidably contacts with an outer peripheral surface of the commutator 24.

A pig tail 43 connects with each power supplying brush 41 to supply electric power to the power supplying brush 41. The pig tail 43 is formed of a flexible conductive wire. A longitudinal first end of the pig tail 43 connects with a portion of the power supplying brush 41 that is located close to the rear end portion of the power supplying brush 41.

A longitudinal second end of each pig tail 43 connects with a choke coil 51. As shown in FIG. 2A, the choke coil 51 is formed of a conductive wire. The choke coil 51 includes a coil portion 52, which has a coil shape, a first connecting portion 53, which extends from an axial first end (a right side end in FIG. 2A) of the coil portion 52, a second connecting portion 54, which extends from an axial second end (a left side end in FIG. 2A) of the coil portion 52, and an iron core 55, which is inserted into the coil portion 52.

As shown in FIGS. 2A and 2B, the coil portion 52 having a circular tube shape is formed by winding the conductive wire forming the choke coil 51 into a spiral shape. The first connecting portion 53 extends from the axial first end of the coil portion 52 in a direction perpendicular to the axial direction of the coil portion 52. A distal end of the first connecting portion 53 is bent at right angle to face opposite to the coil portion 52. The distal end of the first connecting portion 53 extends parallel with the axial direction of the coil portion 52. The distal end of the first connecting portion 53 connects with the longitudinal second end of the pig tail 43. The distal end of the first connecting portion 53 and the longitudinal second end of the pig tail 43 are welded to be connected with each other. The second connecting portion 54 extends from the axial second end of the coil portion 52 in a direction perpendicular to the axial direction of the coil portion 52. The second connecting portion 54 extends so that a distal end of the second connecting portion 54 face opposite to the first connecting portion 53.

The iron core 55 has a circular column shape, which has an outer diameter substantially the same as an inner diameter of the coil portion 52. An axial length L1 of the iron core 55 is longer than an axial length L2 of the coil portion 52. The iron core 55 is inserted into the interior of the coil portion 52 so that an axial direction of the iron core 55 is the same as the axial direction of the coil portion 52. The iron core 55 inserted into the coil portion 52 has an end close to the first connecting portion 53 that projects from an end of the coil portion 52 close to the first connecting portion 53, that is, the axial first end of the coil portion 52, to the outside of the coil portion 52. A portion of the iron core 55 that projects in the axial direction of the coil portion 52 from the axially first end of the coil portion 52 is a projecting portion 55a. An end portion of the iron core 55 that is close to the second connecting portion 54 of the coil portion 52 is arranged at a position substantially the same as an end portion of the coil portion 52 close to the second connecting portion 54, that is, a position substantially the same as the axial second end of the coil portion 52.

As shown in FIG. 1B, each power supplying terminal 61 connects with the second connecting portion 54 of the choke coil 51. Each power supplying terminal 61 is formed by pressing a metal plate material having electrical conductivity. Each power supplying terminal 61 has a substantially band shape.

As shown in FIGS. 2A and 2B, a longitudinal first end (a right side end in FIG. 2A) of the power supplying terminal 61 includes an iron core holding portion 62, which holds the projecting portion 55a of the iron core 55. The iron core holding portion 62 includes two restriction holding portions 62a and a coupling holding portion 62b, which connects the restriction holding portions 62a to each other. Each of the restriction holding portions 62a has a flat plate shape. An interval is formed between the restriction holding portions 62a that is substantially the same as the outer diameter of the iron core 55. The restriction holding portions 62a extend parallel with each other. The coupling holding portion 62b has a flat plate shape and couples one sides of the restriction holding portions 62a that face to each other. The coupling holding portion 62b extends perpendicular to the restriction holding portions 62a. Each restriction holding portion 62a projects from the coupling holding portion 62b by a projection length that is longer than a radius of the iron core 55. In the present embodiment, the projection length is substantially the same as the outer diameter of the iron core 55. In the present embodiment, the iron core holding portion 62 has a C-shape as viewed in one direction (shown in FIG. 2B) perpendicular to the restriction holding portion 62a and the coupling holding portion 62b. The iron core holding portion 62 includes an iron core holding recess portion 62c formed by the restriction holding portions 62a and the coupling holding portion 62b. The iron core holding recess portion 62c has a depth that is deeper than the radius of the iron core 55. The iron core holding recess portion 62c includes an opening portion 62d (an opening portion that opens toward right side in FIG. 2B), which opens at the ends of the restriction holding portions 62a that are opposite to the coupling holding portion 62b. The opening portion 62d opens so that the projecting portion 55a is insertable into the iron core holding recess portion 62c in a direction perpendicular to the axial direction of the coil portion 52.

A positional projection 63 is formed as a single member with one of the two restriction holding portions 62a (one of the restriction holding portions 62a far from a first coupling portion 64 described below). The positional projection 63 extends from one of the restriction holding portions 62a in a direction opposite to a longitudinal second end of the power supplying terminal 61.

The first coupling portion 64 is formed as a single member with the other one of the restriction holding portions 62a. The first coupling portion 64 extends from an end portion of the restriction holding portion 62a that is located opposite to the coupling holding portion 62b. The first coupling portion 64 has a flat plate shape. The first coupling portion 64 extends perpendicular to the other one of the restriction holding portions 62a and parallel with the coupling holding portion 62b. The first coupling portion 64 extends in a direction inclined to a direction along which the two restriction holding portions 62a face to each other.

A choke coil connecting portion 65 is formed as a single member with an end portion of the first coupling portion 64 that is opposite to the iron core holding portion 62. That is, the first coupling portion 64 couples the choke coil connecting portion 65, which is arranged at a substantially longitudinal central part in the power supplying terminal 61 and the iron core holding portion 62. The choke coil connecting portion 65 projects by a small amount relative to the first coupling portion 64 in a direction same as the direction in which the iron core holding portion 62 projects relative to the first coupling portion 64.

A second coupling portion 66 extends from an end portion of the choke coil connecting portion 65 that is opposite to the first coupling portion 64. The second coupling portion 66 has a flat plate shape. The second coupling portion 66 is arranged so that two end surfaces in a thickness direction thereof are located in the same flat planes as two end surfaces of the first coupling portion 64 in the thickness direction thereof.

A power supplying portion 67 is formed as a single member with an end portion of the second coupling portion 66 that is opposite to the choke coil connecting portion 65. That is, the second coupling portion 66 couples the power supplying portion 67, which is arranged at a longitudinal second end (a left side end in FIG. 2A) of the power supplying terminal 61 and the choke coil connecting portion 65. The power supplying portion 67 extends in a direction perpendicular to the second coupling portion 66. The power supplying portion 67 has a band shape. The power supplying portion 67 extends toward a backside on FIG. 2A.

A capacitor connecting portion 68 is formed integrally with a portion of the second coupling portion 66 that is located between the choke coil connecting portion 65 and the power supplying portion 67. The capacitor connecting portion 68 is arranged at a first end of the second coupling portion 66 in the width direction of the power supplying terminal 61. The capacitor connecting portion 68 protrudes in a direction opposite to the power supplying portion 67 and perpendicular to the second coupling portion 66. A distal end of the capacitor connecting portion 68 has a connecting recess 68a, which recesses from the distal end toward a basal end of the capacitor connecting portion 68.

The choke coil 51 is arranged to the power supplying terminal 61 in a state in which the second connecting portion 54 is connected to the choke coil connecting portion 65 and the projecting portion 55a of the iron core 55 is held by the iron core holding portion 62. The second connecting portion 54 is arranged on a side surface of the choke coil connecting portion 65 that projects relative to the first coupling portion 64 and the second coupling portion 66. The second connecting portion 54 is directly connected to the choke coil connecting portion 65 by welding. The projecting portion 55a of the iron core 55 is inserted into the iron core holding recess portion 62c (that is, the projecting portion 55a is arranged in the iron core holding portion 62) so that the projecting portion 55a is arranged between the two restriction holding portions 62a. The position of the iron core 55 is set by positioning the end of the projecting portion 55a relative to the positional projection 63. In the present embodiment, the iron core 55 is arranged relative to the power supplying terminal 61 so that the end of the iron core that is close to the first connecting portion 53 overlaps the positional projection 63. This sets the position of the iron core 55 relative to the power supplying terminal 61. Setting the position of the iron core 55 relative to the power supplying terminal 61 using the positional projection 63 also sets the position of the choke coil 51 relative to the power supplying terminal 61.

As shown in FIG. 1B, the inner peripheral surface 32a of the base 32 includes two choke coil insert portions 35. The two choke coil insert portions 35 are formed at an area of the inner peripheral surface 32a of the base 32 that is one side (lower side in FIG. 1B) of the pair of the brush holding portion 33. Here, a line passing through a radial center of the base 32 and extends in a direction perpendicular to the longitudinal directions of two brush holding portions 33 is referred to as a symmetric line T. The two choke coil insert portions 35 are respectively arranged at two sides of the symmetric line T. Each of the choke coil insert portions 35 has a groove shape extending parallel with the brush holding portion 33. The two choke coil insert portions 35 have shapes that are symmetric to each other relative to the symmetric line T. The two brush holding portions 33 also have shapes that are symmetric to each other relative to the symmetric line T. Each choke coil insert portion 35 opens toward the interior of the yoke 11. Each choke coil insert portion 35 has a width in a transverse direction that is greater than the outer diameter of each coil portion 52 by a small amount.

Figure 3:
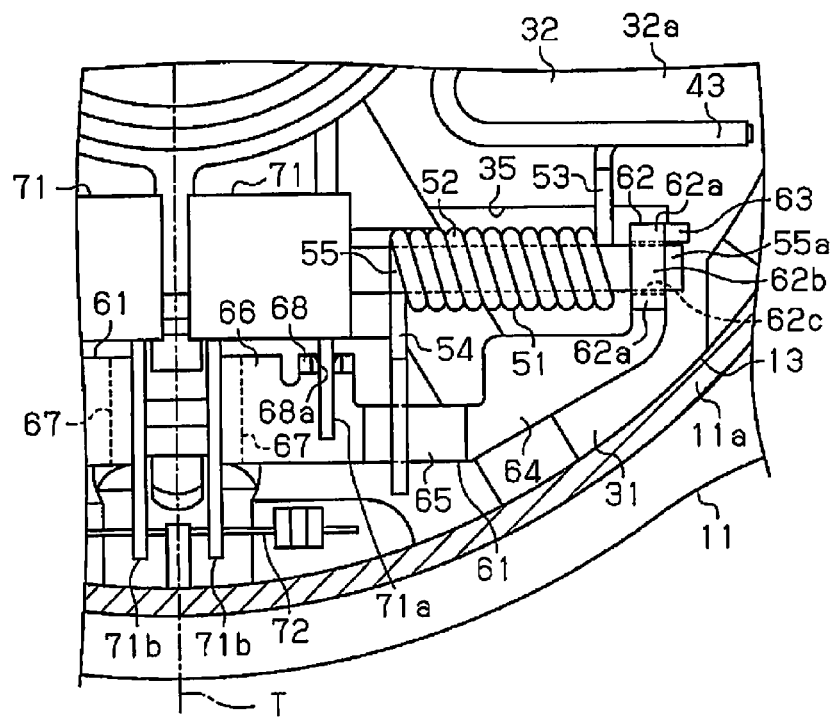
FIG. 3 is a partially enlarged cross-sectional view of the motor shown in FIG. 1B.

As shown in FIGS. 1B and 3, the power supplying terminal 61 of each of the two choke coils 51 arranged in the brush device 13 is assembled to the base 32 when the coil portion 52 is inserted into the choke coil insert portion 35 in the axial direction of the motor 10. When the brush device 13 of the present embodiment is manufactured, the choke coil 51 is assembled to each power supplying terminal 61 so that the choke coil 51 is held by the power supplying terminal 61. Subsequently, the power supplying terminal 61, which hold the choke coil 51 is assembled to the base 32 (the brush holder 31). When the power supplying terminal 61 is assembled to the base 32, the opening portion 62d of the iron core holding recess portion 62c opens toward the base 32 (extends toward a backside on FIG. 1B). The pig tail 43 curves in accordance with a distance between the first connecting portion 53 of the choke coil 51 and the power supplying brush 41. When viewing the brush device 13 from the inner peripheral surface 32a of the base 32 (that is, a state shown in FIG. 1B), the two choke coils 51 are line-symmetric with respect to the symmetric line T. Also the two power supplying terminals 61 are line-symmetric with respect to the symmetric line T. As shown in FIG. 1A, the power supplying portion 67 of each power supplying terminal 61 extends through the base 32 and projects out of the yoke 11. Respective portions of the two power supplying portions 67 that project out of the yoke 11 are inserted into and held by terminal holding portions 36. The terminal holding portions 36 each has a circular column shape and extends in the axial direction of the motor 10 from the base 32 toward the outside of the yoke 11. Respective distal ends of the two power supplying portions 67 project from the distal ends of the terminal holding portions 36 and connect with an electric power supply device.

As shown in FIGS. 1B and 3, two capacitors 71 are arranged at a portion between the two choke coils 51 arranged on the inner peripheral surface 32a of the base 32. Each capacitor 71 includes two connection terminals 71a, 71b. The two capacitors 71 are arranged between the two coil portions 52 of the choke coils 51 and arranged at two sides of the symmetric line T. The capacitors 71 are arranged adjacent to the second coupling portions 66. The connection terminal 71a, which is one of the connection terminals of each capacitor 71 is inserted into the connecting recess 68a of the capacitor connecting portion 68 arranged at the second coupling portion 66. The connection terminal 71a is connected to the capacitor connecting portion 68 by welding and the like. A ground terminal 72 is arranged on the inner peripheral surface 32a of the base 32. The ground terminal 72 is arranged so that the power supplying terminals 61 are respectively arranged between the ground terminal 72 and the two capacitors 71. The connection terminal 71b, which is the other one of the connection terminals is connected to the ground terminal 72 by welding and the like. The ground terminal 72 is connected with the yoke 11 and grounded (earthed) through the yoke 11.

Figure 4:
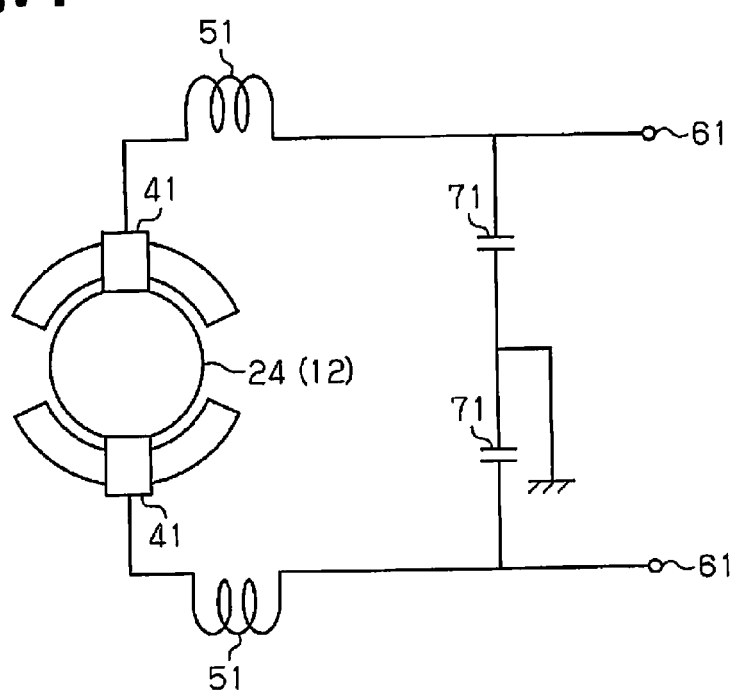
FIG. 4 is a circuit diagram of the motor shown in FIG. 1B.

As shown in FIGS. 1B and 4, in the motor 10 of the present embodiment, each of the power supplying terminals 61 is connected to the corresponding power supplying brush 41 through the choke coil 51, which is connected to the power supplying terminal 61 and the pig tail 43, which is connected to the choke coil 51.

The operation of the motor of the present embodiment will now be described.

Electrical current supplied to the two power supplying terminals 61 is supplied to the power supplying brushes 41 through the choke coils 51 and the pig tails 43. Subsequently, electrical current is supplied from the power supplying brushes 41 through the commutator 24 to the windings 23. This rotates the armature 12. At this time, the choke coils 51 and the capacitors 71 eliminate the noise of electric current supplied to the windings 23.

In addition, in the motor 10, the projecting portion 55a of the iron core 55 is held by the iron core holding portion 62 of the power supplying terminal 61 and the second connecting portion 54 is connected to the choke coil connecting portion 65 of the power supplying terminal 61. The two restriction holding portions 62a of the iron core holding portion 62 restrict the projecting portion 55a to move in a direction, which corresponds to a radial direction of the iron core 55 and corresponds to the facing direction in which the restriction holding portions 62a face to each other. In addition, the coupling holding portion 62b restricts the projecting portion 55a to move in a direction, which corresponds to a thickness direction of the coupling holding portion 62b and corresponds to a radial direction of the iron core 55. In addition, the second connecting portion 54 is directly connected to the choke coil connecting portion 65 of the power supplying terminal 61 by welding. The power supplying terminal 61 is formed of a metal plate material, which has a higher rigidity than the rigidity of the pig tail 43, which is formed from the conductive wire. As discussed above, the choke coil 51 is held by the power supplying terminal 61 at two locations separated to each other in the axial direction of the coil portion 52. Accordingly, the choke coil 51 is not likely to be displaced relative to the power supplying terminal 61. In addition, since the power supplying terminal 61, which holds the choke coil 51 is assembled to the brush holder 31, vibration of the choke coil 51 does not likely occur in the interior of the motor 10.

The present embodiment has the advantages described below.

(1) The iron core holding portion 62 of the power supplying terminal 61 assembled to the brush holder holds the projecting portion 55a of the iron core 55 of the choke coil 51. Accordingly, holding the iron core 55, which is not a flexible member in the choke coil 51 by the iron core holding portion 62 enables the choke coil 51 to be held in a state in which the displacement of the choke coil 51 is suppressed. In addition, the second connecting portion 54 of the choke coil 51 is connected to the power supplying terminal 61, and the projecting portion 55a of the iron core 55 is held by the iron core holding portion 62 of the power supplying terminal 61. Accordingly, the choke coil 51 is held by the power supplying terminal 61 at two locations separated to each other in the axial direction of the coil portion 52. This configuration suppresses the displacement of the choke coil 51 relative to the power supplying terminal 61. In addition, the power supplying terminal 61, which holds the choke coil 51 at two locations is assembled to the brush holder 31. Accordingly, the displacement of the choke coil 51 relative to the brush holder 31 is also suppressed. In addition, since the power supplying terminal 61, which is assembled to the brush holder 31 holds the choke coil 51, a component dedicated to hold the choke coil 51 at the brush holder 31 may not be required. This suppresses increase in the number of the steps of assembling the choke coil 51 to the brush holder 31 and suppresses increase in the number of the components.

(2) The iron core holding portion 62 holds the projecting portion 55a, and the second connecting portion 54 connects with the power supplying terminal 61. Accordingly, the power supplying terminal 61 holds two portions of the choke coil 51 that corresponds to two ends of the coil portion 52. This further suppresses the displacement of the choke coil 51 relative to the power supplying terminal 61 and the displacement of the choke coil 51 relative to the brush holder 31.

(3) The iron core holding portion 62 includes the iron core holding recess portion 62c. The iron core holding recess portion 62c has the opening portion 62d that opens so that the projecting portion 55a is insertable to the iron core holding recess portion 62c in a direction perpendicular to the axial direction of the coil portion 52. Accordingly, the projecting portion 55a is readily inserted into the iron core holding recess portion 62c by moving the iron core 55 in the direction perpendicular to the axial direction of the coil portion 52. This facilitates the assembling of the iron core 55 to the iron core holding portion 62.

(4) The opening portion 62d of the iron core holding recess portion 62c opens toward the brush holder 31. Accordingly, the projecting portion 55a is arranged between the brush holder 31 and the iron core holding portion 62 in a state in which the power supplying terminal 61 is assembled to the brush holder 31. This configuration suppresses the projecting portion 55a from being fallen from the iron core holding portion 62. In addition, the projecting portion 55a is suppressed from being fallen from the iron core holding portion 62 when the power supplying terminal 61, which holds the choke coil 51 is assembled to the brush holder 31.

(5) The first connecting portion 53 is directly connected with the pig tail 43. Accordingly, a component dedicated to connect between the first connecting portion 53 and the pig tail 43 is not disposed therebetween. This suppresses increase in the number of the steps of assembling the choke coil 51 to the brush holder 31 and suppresses increase in the number of the components. In addition, the power supplying terminal 61 holds the second connecting portion 54 and the projecting portion 55a of the choke coil 51. This suppresses the displacement of the choke coil 51 arranged in the interior of the motor 10 even when the first connecting portion 53 is directly connected to the pig tail 43, which is flexible and likely bent.

(6) Since the power supplying terminal 61 is formed of a metal plate material, the power supplying terminal 61 has higher rigidity than the pig tail 43, which is formed of a conductive wire. The deformation of the power supplying terminal 61 does not likely occur relative to the pig tail 43. In addition, the iron core holding portion 62 holds the portion of the iron core 55 of the choke coil 51 that is close to the first connecting portion 53. This configuration restricts the iron core 55 from moving in the radial direction (in the radial direction of the coil portion 52). The second connecting portion 54, which extends from the axial end of the coil portion 52 that is opposite to the first connecting portion 53 is connected with the power supplying terminal 61 by welding. This suppresses the displacement of the choke coil 51 relative to the power supplying terminal 61 caused by the vibration and the like, which occur when the motor 10 is driven. Accordingly, the connection between the second connecting portion 54 and the power supplying terminal 61 is suppressed from receiving load. This configuration suppresses generation of the connection failure.

(7) In the present embodiment, when the brush device 13 is manufactured, the choke coil 51 is assembled to each power supplying terminal 61 so that the power supplying terminal 61 holds the choke coil 51. Subsequently, the power supplying terminal 61, which holds the choke coil 51 is assembled to the base 32 (brush holder 31). Since this configuration suppresses the displacement of the choke coil 51 relative to the power supplying terminal 61, the choke coil 51 and the power supplying terminal 61 are readily assembled to the brush holder 31. In addition, the choke coil 51 is readily arranged to a preferable assembling position in the brush holder 31, that is, to a position at which the coil portion 52 is inserted into the choke coil insert portion 35. Accordingly, the choke coil 51 and the power supplying terminal 61 are suppressed from being assembled to the brush holder 31 in a state in which the choke coil 51 and the power supplying terminal 61 are displaced with respect to the brush holder 31.

(8) The power supplying terminal 61 includes the positional projection 63. This configuration facilitates the positioning of the iron core 55, which has an axial length longer than the axial length of the coil portion 52, with respect to the power supplying terminal 61. Accordingly, this configuration facilitates the positioning of the choke coil 51 with respect to the power supplying terminal 61.

The present invention may be embodied in the following forms.

In the embodiment, the brush holder 31 includes the choke coil insert portion 35. The brush holder 31 does not necessarily include the choke coil insert portion 35.

In the embodiment, the opening portion 62d of the iron core holding recess portion 62c opens toward the base 32 in a state in which the power supplying terminal 61 is assembled to the brush holder 31. However, the opening direction of the opening portion 62d of the iron core holding recess portion 62c is not limited to this. The opening portion 62d of the iron core holding recess portion 62c only needs to open so that the projecting portion 55a of the iron core 55 is insertable to the iron core holding recess portion 62c. For example, the opening portion of the iron core holding recess portion 62c may open toward the opposite side of the base 32. This example also has an advantage similar to (3) of the embodiment.

The shape of the iron core holding portion 62 is not limited to the shape described in the embodiment. The iron core holding portion 62 only needs to have a shape that hold the projecting portion 55a so as to restrict the movement of the projecting portion 55a in the radial direction of the coil portion 52. For example, the iron core holding portion 62 may have any of a circular arc shape, a U-shape, a V-shape and a ring shape when viewing in the axial direction of the iron core 55 (same direction as the axial direction of the coil portion 52).

In the embodiment, the iron core holding portion 62 holds the projecting portion 55a, which projects from the axial first end of the coil portion 52, and the second connecting portion 54 connects with the power supplying terminal 61. However, the iron core holding portion 62 may hold the projecting portion 55b, which projects from the axial second end of the coil portion 52, and the first connecting portion 53 may connect with the power supplying terminal 61. In this case, the pig tail 43 connects with the second connecting portion 54. This example also has an advantage similar to that in the embodiment.

In the embodiment, the power supplying terminal 61 holds two portions of the choke coil 51 that correspond to the two axial ends of the coil portions 52. However, the power supplying terminal 61 may hold two portions of the choke coil 51 that correspond to the axial one end of the coil portion 52. For example, the second connecting portion 54 may connect with the power supplying terminal 61, and the iron core holding portion 62 may hold the projecting portion 55b, which projects from the axial second end of the coil portion 52. Conversely, the first connecting portion 53 may connect with the power supplying terminal 61, and the iron core holding portion 62 may hold the projecting portion 55a, which projects from the axial first end of the coil portion 52. In this case, the pig tail 43 connects with the second connecting portion 54. Also in this example, the power supplying terminal 61 holds the two portions of the choke coil 51. This suppresses the displacement of the choke coil 51 with respect to the power supplying terminal 61. In addition, the power supplying terminal 61, which holds two portions of the choke coil 51 is assembled to the brush holder 31. This also suppresses the displacement of the choke coil 51 with respect to the brush holder 31. In addition, the power supplying terminal 61, which is assembled to the brush holder 31 holds the choke coil 51. Accordingly, a component dedicated to hold the choke coil 51 at the brush holder 31 is not necessarily arranged as a separated component. This suppresses increase in the number of the steps of assembling the choke coil 51 to the brush holder 31 and suppresses increase in the number of the components The shape of the power supplying terminal 61 is not limited to the shape described in the embodiment. The power supplying terminal 61 only needs to have a shape including the iron core holding portion 62 that holds the projecting portion 55a projected in the axial direction from the coil portion 52, and to be connected with the electric power supply. For example, the power supplying terminal 61 may have the shape, which does not include the positional projection 63.

In the embodiment, the motor 10 includes two power supplying brushes 41 (two power supplying brushes 41). However, the number of the power supplying brushes 41 arranged in the motor 10 is not limited to this, and may be equal to or more than three. In this case, the number of the power supplying terminal 61 may be changed in accordance with the number of the power supplying brush 41.

In the embodiment, the motor 10 is used as a driving source for the pump device. However, the motor 10 may be used as a driving source for the device other than the pump device. In this case, the rotation shaft 21 does not necessarily include the eccentric shaft portion 21a.

In the embodiment, discussion has not been made on the manner of holding the choke coil 51 with respect to the brush holder 31. As shown in FIGS. 5A to 5C, the brush holder 31 may hold the choke coil 51 by placing the coil portion 52 of the choke coil 51 on a placing portion 81 of the brush holder 31. This further stabilizes holding of the choke coil 51.

In the embodiment, discussion had been made on the manner of holding the iron core 55 of the choke coil 51 and particularly on the manner of holding the iron core 55 of the choke coil 51 by the power supplying terminal 61. The manner of holding the iron core 55 of the choke coil 51 may be modified as shown in FIGS. 6A to 6C so that the power supplying terminal 61 and the brush holder 31 cooperate to hold the iron core 55. Also the manner of holding the iron core 55 may be modified as shown in FIGS. 7A to 7C so that the brush holder 31 holds the iron core 55.

For example, as shown in FIGS. 6A and 6B, the brush holder 31 may include an iron core holding portion 91, which is located close to the first end of the iron core 55. The iron core holding portion 91 has a protruding shape that fits to the iron core holding recess portion 62c of the iron core holding portion 62 arranged at the power supplying terminal 61. The iron core holding portion 62 of the power supplying terminal 61 and the iron core holding portion 91 arranged at the brush holder 31 sandwiches and hold the projecting portion 55a of the iron core 55. This configuration stably holds the choke coil 51 (iron core 55).

In addition, the iron core 55 may project from the end of the choke coil 51 close to the second connecting portion 54, and the brush holder 31 may include an iron core holding portion 92, which is located close to the second end of the iron core 55. The iron core holding portion 92 includes a projecting distal portion, which has a projecting shape. The projecting distal portion of the iron core holding portion 92 includes a holding recess portion 92a to which a lower half of the iron core 55 is fitted. The iron core holding portion 92 arranged at the brush holder 31 holds the projecting portion 55b of the iron core 55. The iron core holding portion 92 holds the portion of the iron core 55 close to the second end of the iron core 55. This configuration holds the choke coil 51 more stably.

In the modified example shown in FIGS. 6A and 6B, a connection recess 93 is formed between a lower surface of the choke coil connecting portion 65 of the power supplying terminal 61 and the brush holder 31 as shown in FIG. 6C. The power supplying terminal 61 and the choke coil 51 are connected to each other in a state in which the second connecting portion 54 of the choke coil 51 is inserted into the connection recess 93. The second connecting portion 54 is sandwiched between the choke coil connecting portion 65 (the connection recess 93) and the brush holder 31.

Alternately, as shown in FIGS. 7A to 7C, a portion of the power supplying terminal 61 that is located distally from the choke coil connecting portion 65 may be eliminated. The projecting portions 55a, 55b located at the two ends of the iron core 55 are respectively held by iron core holding portions 101, 102 arranged at the brush holder 31. Each of the iron core holding portions 101, 102 has a similar shape as the iron core holding portion 92 discussed above. Specifically, each of the iron core holding portions 101, 102 includes a projecting distal portion, which has a projecting shape. The projecting distal portions of the iron core holding portions 101, 102 respectively include holding recess portions 101a, 102a. The lower half of the iron core 55 is fitted to each of the holding recess portions 101a, 102a. The iron core holding portions 101, 102 arranged at the brush holder 31 hold the choke coil 51 (the iron core 55).

What is claimed is:

1. A motor comprising:
   a power supplying brush;
   a brush holder that holds the power supplying brush;
   a choke coil including:
   a coil portion having a coil shape;
   an iron core inserted into the coil portion, the iron core having a length longer than an axial length of the coil portion, the iron core having a projecting portion that projects from the coil portion in an axial direction of the coil portion;
   a first connecting portion that extends from an axial first end of the coil portion;
   and a second connecting portion that extends from an axial second end of the coil portion; and
   a power supplying terminal assembled to the brush holder, the power supplying terminal connecting with at least one of the first connecting portion and the second connecting portion, wherein the power supplying terminal includes an iron core holding portion that holds the projecting portion, the iron core holding portion includes an iron core holding recess portion, the iron core holding recess portion has an opening-portion that opens so that the projection portion is insertable to the iron core holding recess portion in a direction perpendicular to the axial direction of the coil portion.

2. The motor according to claim 1, wherein the iron core holding portion holds the projecting portion that projects from the axial first end of the coil portion, and the second connecting portion connects with the power supplying terminal.

3. The motor according to claim 1, wherein the opening portion of the iron core holding recess portion opens toward the brush holder.

4. The motor according to claim 1, wherein the brush holder includes an iron core holding portion, the projecting portion is one of the two projecting portions of the iron core that project from the coil portion toward opposite directions in an axial direction of the coil portion, and the two projecting portions are sandwiched and held by the iron core holding portion of the power supplying terminal and the iron core holding portion of the brush holder.

5. The motor according to claim 1, further comprising a pig tail connected to the power supplying brush to supply electric power to the power supplying brush, wherein one of the first connecting portion and the second connecting portion that is not connected with the power supplying brush is directly connected with the pig tail.

* * * * *